(12) United States Patent
Tarnowski et al.

(10) Patent No.: US 11,919,425 B2
(45) Date of Patent: Mar. 5, 2024

(54) ROTARY RECLINE MECHANISM

(71) Applicant: B/E Aerospace, Inc., Winston-Salem, NC (US)

(72) Inventors: Adrian Tarnowski, Wroclaw (PL); Krzysztof Slomiany, Wroclaw (PL); Lukasz Turek, Wroclaw (PL)

(73) Assignee: B/E Aerospace, Inc., Winston-Salem, NC (US)

( * ) Notice: Subject to any disclaimer, the term of this patent is extended or adjusted under 35 U.S.C. 154(b) by 41 days.

(21) Appl. No.: 17/563,840

(22) Filed: Dec. 28, 2021

(65) Prior Publication Data

US 2022/0203870 A1    Jun. 30, 2022

(30) Foreign Application Priority Data

Dec. 28, 2020    (EP) .................................... 20461604

(51) Int. Cl.
   *B60N 2/22*    (2006.01)
   *B60N 2/235*   (2006.01)
   *B64D 11/06*   (2006.01)

(52) U.S. Cl.
   CPC ......... *B60N 2/2213* (2013.01); *B60N 2/2358* (2013.01); *B64D 11/064* (2014.12)

(58) Field of Classification Search
   CPC .. B60N 2/2213; B60N 2/2358; B60N 2/2356; B60N 2/2218; B60N 2/2362; B60N 2/224; B60N 2/2258; B64D 11/064; B64D 11/0619
   See application file for complete search history.

(56) References Cited

U.S. PATENT DOCUMENTS

| | | | |
|---|---|---|---|
| 5,320,308 A | 6/1994 | Bilezikjian et al. | |
| 5,685,610 A * | 11/1997 | Minai | B60N 2/2218 297/367 R |
| 5,899,533 A | 5/1999 | Tatematsu et al. | |
| 8,297,704 B2 | 10/2012 | Endo et al. | |
| 8,678,154 B2 | 3/2014 | Kim | |
| 9,227,533 B2 | 1/2016 | Endou | |

(Continued)

FOREIGN PATENT DOCUMENTS

| | | |
|---|---|---|
| EP | 3722146 A1 | 10/2020 |
| FR | 2921597 B1 | 7/2014 |

(Continued)

OTHER PUBLICATIONS

Extended European Search Report dated Jun. 24, 2021 for EP Application No. 20461604.9, 8 pages.

*Primary Examiner* — David R Dunn
*Assistant Examiner* — Tania Abraham
(74) *Attorney, Agent, or Firm* — Suiter Swantz pc llo

(57) ABSTRACT

A rotary recline mechanism for allowing reclining movement of a first part relative to a second part, the mechanism comprising: a first gear mechanism comprising first and second gear rings having first and second sets of teeth that engage to lock the first and second parts relative to each other and disengage on operation of an actuator to allow relative movement of the first and second parts by application of a force on one of the parts in a first direction, and a second override gear mechanism to allow relative movement of the first and second parts by application of a force in a second direction while the first and second sets of teeth are engaged.

14 Claims, 15 Drawing Sheets

(56) References Cited

U.S. PATENT DOCUMENTS

| | | |
|---|---|---|
| 9,242,583 B2 | 1/2016 | Endou et al. |
| 2002/0159824 A1 | 10/2002 | Marquina |
| 2006/0025270 A1 | 2/2006 | Geer et al. |
| 2013/0113263 A1* | 5/2013 | Yamada .................. B60N 2/02 |
| | | 192/43.1 |
| 2017/0203671 A1* | 7/2017 | Runde .................... F16H 25/18 |
| 2018/0072194 A1* | 3/2018 | Huang ..................... A47C 7/44 |
| 2019/0070980 A1* | 3/2019 | Smuk .................. B60N 2/0244 |
| 2020/0324676 A1 | 10/2020 | Suhre |
| 2020/0324904 A1 | 10/2020 | Suhre |

FOREIGN PATENT DOCUMENTS

| | | |
|---|---|---|
| GB | 893419 A | 4/1962 |
| GB | 1163093 A | 9/1969 |
| KR | 101478371 B1 | 12/2014 |

* cited by examiner

ROTARY RECLINE MECHANISM

CROSS-REFERENCE TO RELATED APPLICATION

The present application claims the benefit of European Patent Office filing Patent Application No. EP20461604.9, filed Dec. 28, 2020, entitled ROTARY RECLINE MECHANISM, which is incorporated herein by reference in the entirety.

TECHNICAL FIELD

The present disclosure is concerned with surface angle adjustment mechanisms that enable a first part or surface to recline with respect to a second part or surface, for example a mechanism for reclining a seat back with respect to a seat pan or seat cushion.

BACKGROUND

There are many applications where it is desired to enable a rotary movement of one part or surface relative to another such that the angular relationship between the two parts or surfaces can be varied. One example is an adjustable seat or chair, where it may be desirable to adjust the angle of the seat back relative to the seat pan to allow the seat back to be moved between an upright position and a reclined position. Adjustable seats are used in the home and workplace as well as in vehicles such as automobiles and aircraft. In aircraft seats, the seat generally has to be in an upright position for take-off and landing but can be reclined during flight to improve passenger comfort. The seat can be reclined by the passenger operating a button or lever, usually in or on the seat arm and pushing back against the seat back until the seat is in the desired reclined position. The seat will remain in the reclined position until the passenger operates the button or lever to cause the seat to return to the upright position. Various mechanisms are known for allowing seat backs to be reclined in aircraft seats and also in other types of adjustable seats. Such mechanisms are also known for allowing adjustment of surfaces other than seats.

Mechanisms are known that comprise mechanical actuators for adjusting the position and angle of the seat back and seat pan relative to a fixed frame. Some mechanisms use lock members having teeth and pawl arrangements. A mechanical actuator, operated by the user, disengages the teeth so that the seat back can be pushed back from the upright position with respect to the seat pan. A spring is biased to bring the seat back back to the upright position.

Other recline mechanisms, which are better able to provide a greater range of positions, include a gas spring mechanism. The user operates an actuator e.g. by pressing a button that releases a valve in the gas spring to allow the seat back to be pushed back to a desired reclined position by the user exerting force on the seat back. To bring the seat back back to the upright position, the button is pressed, the gas that has accumulated in the spring is released and the seat back moves to the upright position.

Such conventional mechanisms are fairly complex in construction and are large, heavy and costly to manufacture, install and maintain. Gas springs are prone to leakage and therefore require seals. Further, because the pressure within the gas spring is high, if the device is damaged, this release of the high pressure can be dangerous for the user. There is a need for a recline mechanism that has a simpler construction and that is lighter and takes up less space but still allows a simple, robust operation and allows a large range of recline positions. Particularly (but not only) in aircraft, size and weight considerations are important.

SUMMARY

According to one aspect of the disclosure, there is provided a rotary recline mechanism for allowing reclining movement of a first part relative to a second part, the mechanism comprising: A rotary recline mechanism for allowing reclining movement of a first part relative to a second part, the mechanism comprising: a first gear mechanism comprising first and second gear rings having first and second sets of teeth that engage to lock the first and second parts relative to each other and disengage on operation of an actuator to allow relative movement of the first and second parts by application of a force on one of the parts in a first direction, and a second override gear mechanism to allow relative movement of the first and second parts by application of a force in a second direction while the first and second sets of teeth are engaged.

The mechanism preferably has a first flange configured to attach the mechanism to the first part, and a second flange configured to attach the mechanism to the second part, the first gear ring attached to the first flange and the second gear ring attached to the second flange.

A torsional spring is preferably pre-tensioned to bias the first gear ring to a position in which the first part is upright relative to the second part.

The mechanism preferably also includes a second, ratchet gear mechanism located within the second gear ring to provide an override mechanism whereby the position of the first part relative to the second part can be returned to a start position without disengaging the first and second sets of teeth by means of the actuator. A ratchet gear cover may be secured to a hub, and a plurality of pawls are pivotally mounted to the hub, e.g. by pins, wherein the second gear ring is provided with a plurality of inwardly extending teeth and the pawls are provided with outer teeth arranged to mesh with the inwardly extending teeth.

Preferably, the teeth of the ratchet gear mechanism have a slope on one side that is steeper than the slope on the other side to enable the override function.

The mechanism may further comprise a linear guide bearing arranged to slide along the main shaft.

The mechanism may also be provided with head injury criterion (HIC) features comprising a shear pin to limit the angular range of movement between the first and second parts in normal operation, wherein the shear pin is configured to shear in response to a predetermined force, such that the angular range of movement between the first and second parts is increased. Hard stops may limit the angular range of movement to the increased range when the shear pin has sheared.

The first part may be a seat back and the second part may be a seat pan or a seat cushion of a reclining or adjustable seat such as an aircraft seat. The actuator may be provided in or on a seat arm rest.

Examples of the disclosure will be described, by way of example only, with reference to the drawings.

DETAILED DESCRIPTION

Referring to the figures, the mechanism 100 is provided in a unit to be mounted to the parts or surfaces to be adjusted relative to each other. The following description refers to the mechanism for use in adjusting a seat 102 e.g. an aircraft passenger seat 102. It should be noted, however, that the disclosure is not so limited and the mechanism can be used in other reclining or adjustable seats or, indeed, in other applications where two parts or surfaces are to be adjusted relative to each other.

Figure 1A:
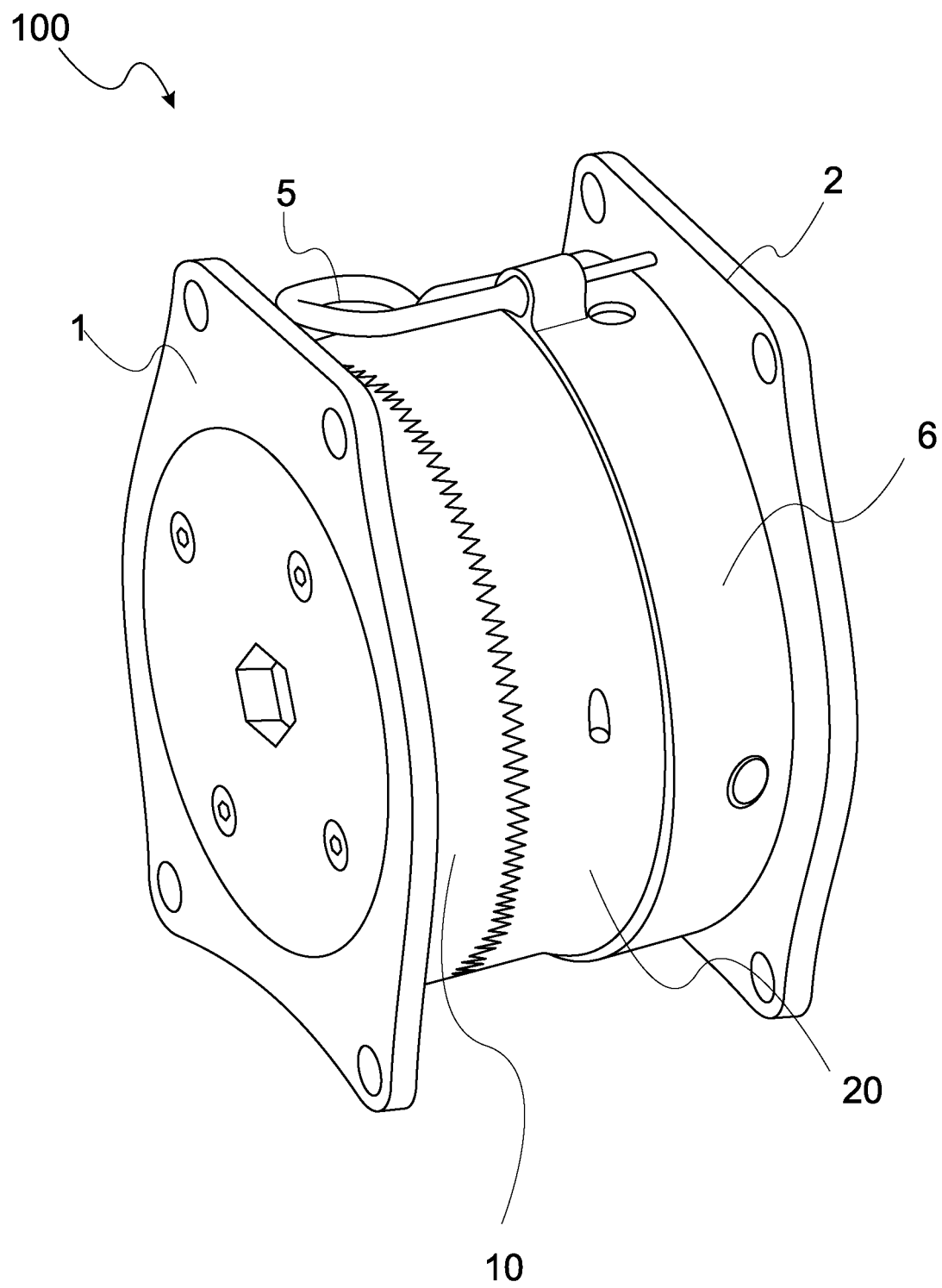
FIG. 1A is a perspective view of a rotary recline mechanism according to the disclosure.
Figure 1B:
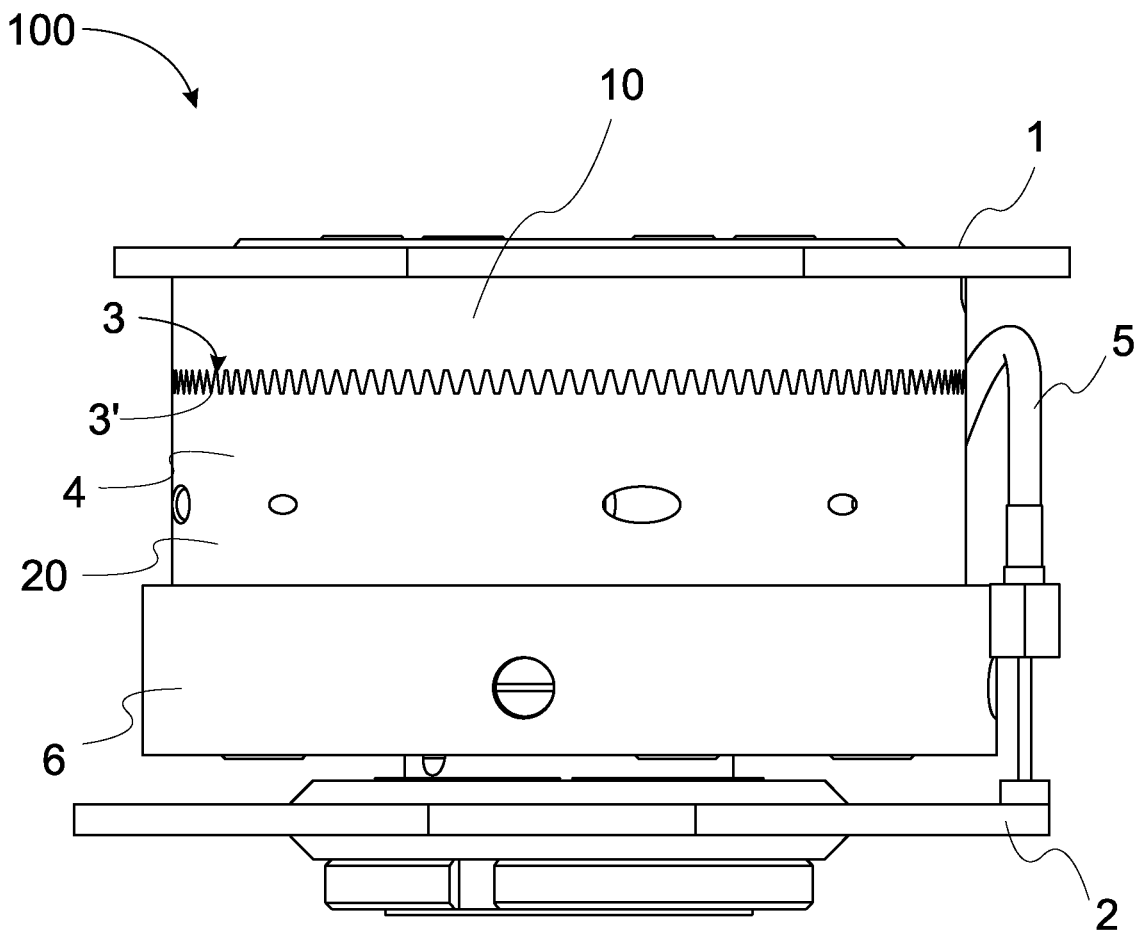
FIG. 1B is a planar view of the mechanism of FIG. 1A

As can be seen in FIGS. 1A and 1B, the mechanism 100 comprises a first flange 1 to be mounted to one of the moveable surfaces (e.g. the seat back 104) and a second flange 2 configured to be attached to the other relatively moveable surface (e.g. the seat pan 106 or seat base (e.g., cushion 108). A gear mechanism, described further below, between the two flanges 1,2 allows the surfaces to be adjusted relative to each other. In the example of a seat, the gear mechanism allows the seat back 104 to be reclined relative to the seat base 108 and returned to a relatively upright position. The gear mechanism is configured to allow the seat back 104 to be positioned in a number of relatively reclined positions between an upright position and a position of maximum permitted recline. In aircraft seats or the like, the maximum permitted recline position will usually be set at an angle to avoid the seat extending into the seat area of a seat behind the seat being reclined.

Figure 2:
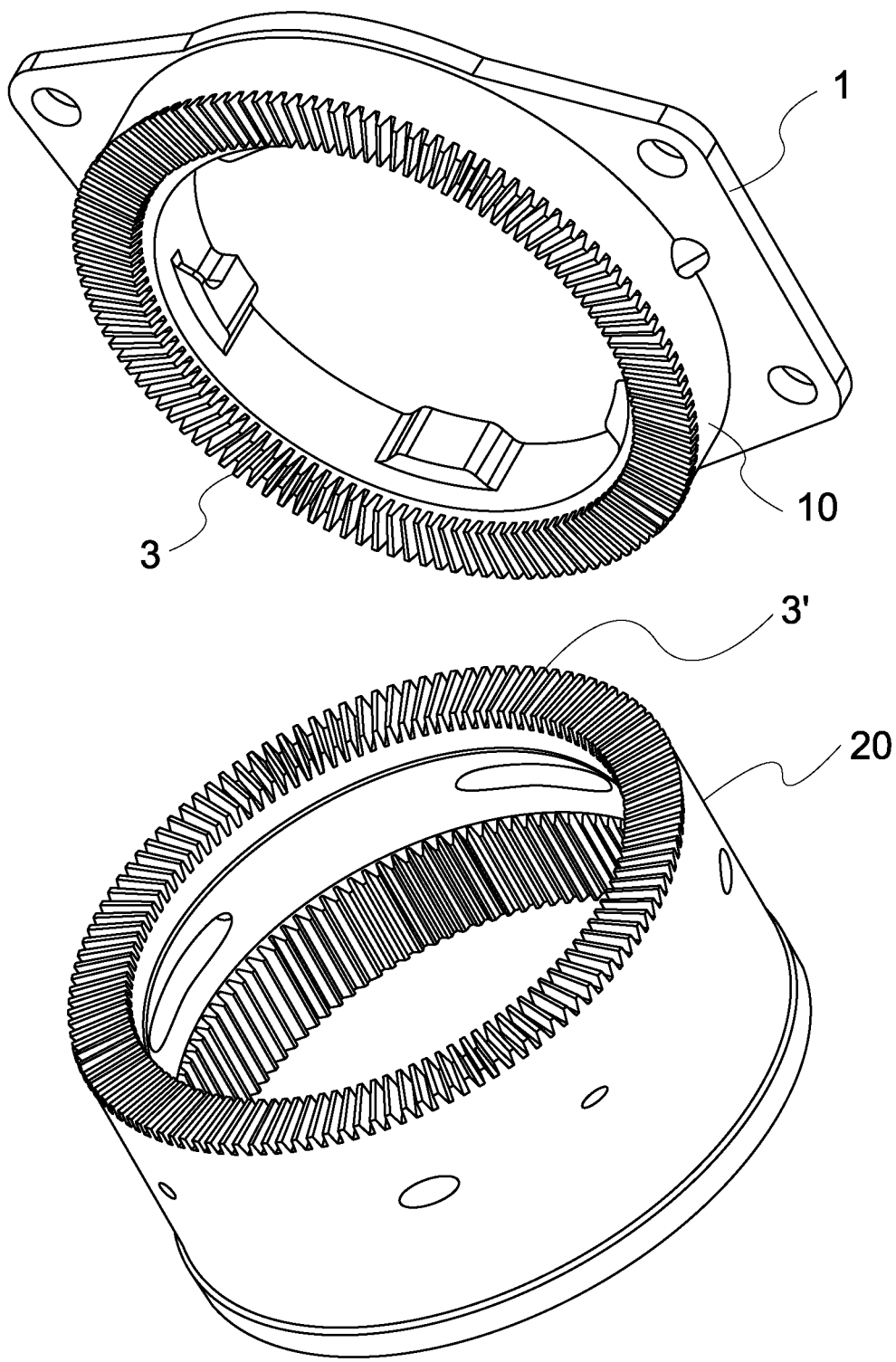
FIG. 2 shows the components of a crown gear of a mechanism according to the disclosure.

The gear mechanism comprises a crown gear (seen in detail in FIG. 2) comprising a first gear ring 10 axially extending from the first flange 1 in the direction of the second flange and having a plurality of first gear teeth 3, and a second gear ring 20 connected to the second flange 2 and having a corresponding plurality of second gear teeth 3' that mesh with the first gear teeth 2. A torsional spring 40 biases the first flange 1 to a rotational position in which the seat back is upright relative to the seat base. The second gear ring 20 houses an inner ratchet gear mechanism that will be described in more detail below. An actuator mechanism such as a cable 5 is mounted in a ratchet ring cover 6 attached between the second gear ring 20 and the second flange 2.

When the seat back is to be reclined relative to the seat base, the teeth of the first and second gear rings are disengaged. This may be by a passenger pressing a button or actuating lever that actuates the cable 5. The cable 5 pulls the ratchet ring cover 6 axially relative to the first gear ring 10. When the teeth 3, 3' are disengaged, the first and second gear rings are able to rotate relative to each other so that the seat back can be reclined relative to the seat base as the passenger applies force against the seat back against the bias of the torsion spring 40. The possible positions of the seat back are limited by the number of teeth 3, 3'. The mechanism can be designed for different numbers of seat positions by varying the number of teeth. When the seat back is reclined to the desired position it is locked in position by engagement of the teeth 3, 3'.

When the passenger wishes to return the seat back to the upright position, the cable actuator 5 is again actuated to disengaged the teeth of the two ring gears 10, 20 and, if no force is applied against the seat back by the passenger, the seat back will return to the upright position due to the force of the torsional spring.

Figure 1C:
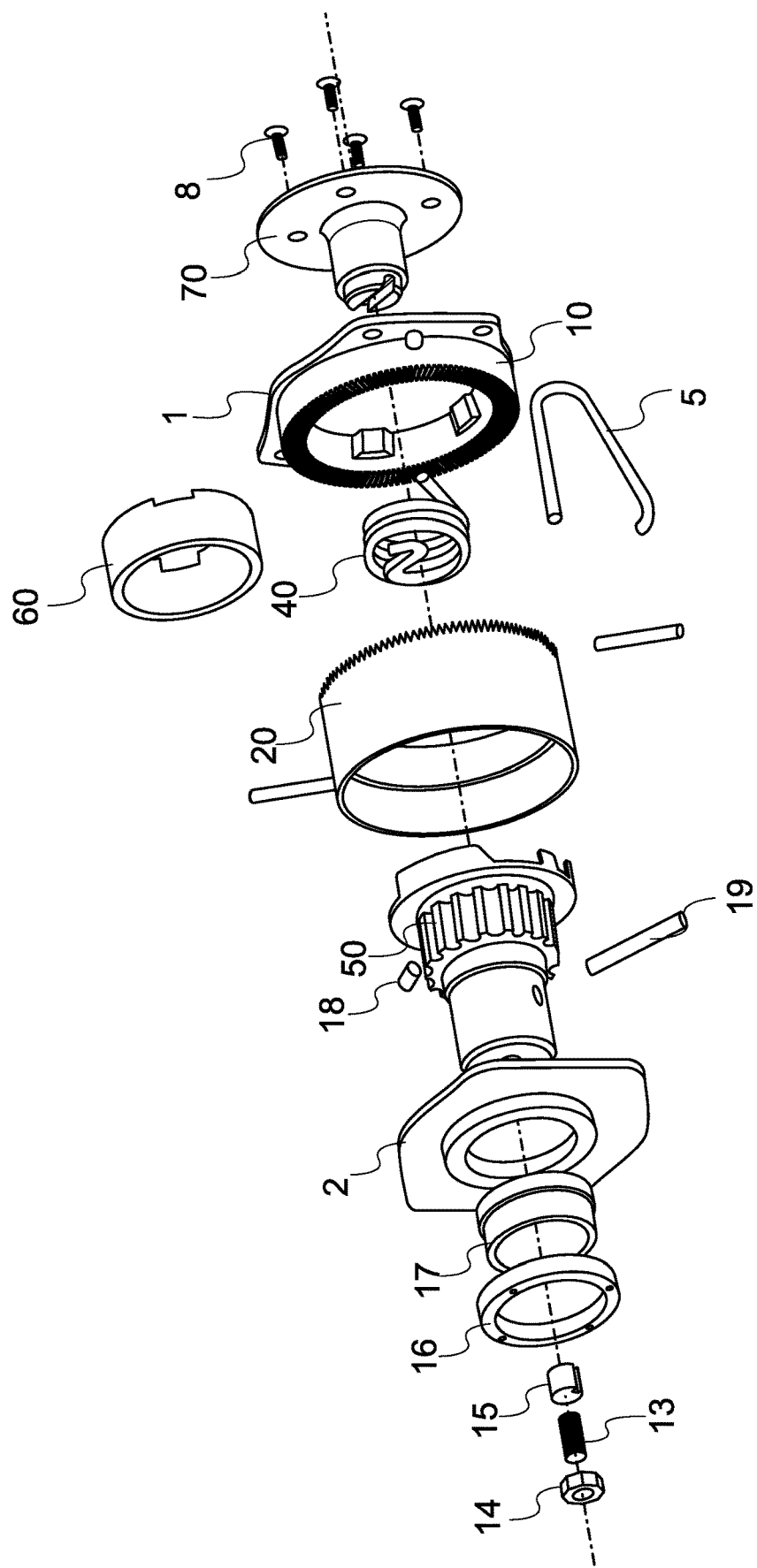
FIG. 1C is an exploded view of the mechanism of FIG. 1A.

FIG. 1C is an exploded view showing other components of the mechanism. In addition to the gear rings 10, 20 and torsional spring 40 described above, FIG. 1C shows a main shaft 50 of the mechanism around which the components are mounted and a linear guide bearing 60 described below. Shear pin 18 is also described further below. The locking plate 70, pins 19, bushing 17, bearing nut 16, slider 15, plug 14 and spring 13 are merely for mounting the assembly together and will not be described further.

Figure 3:
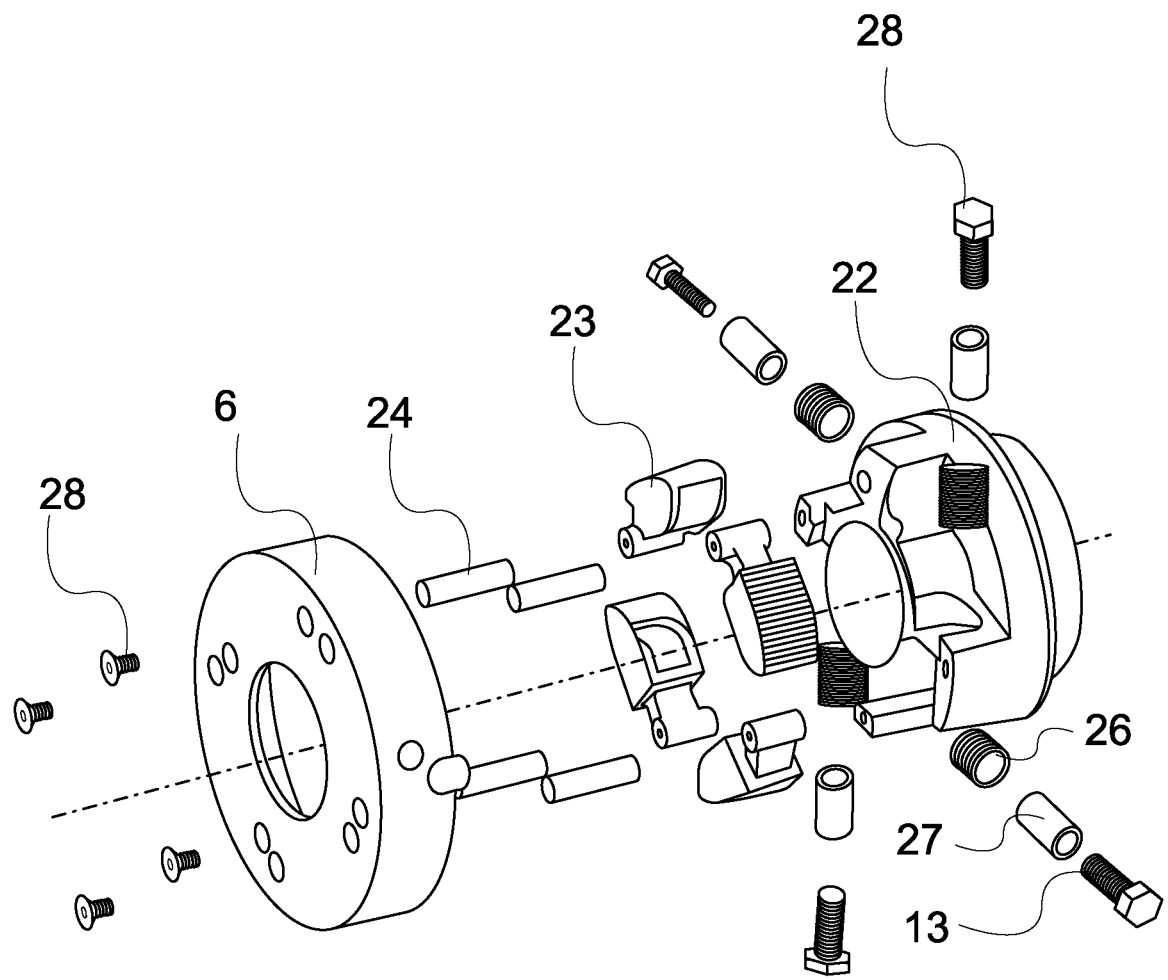
FIG. 3 is an exploded view of an inner gear part of the mechanism of FIG. 1.
Figure 4:
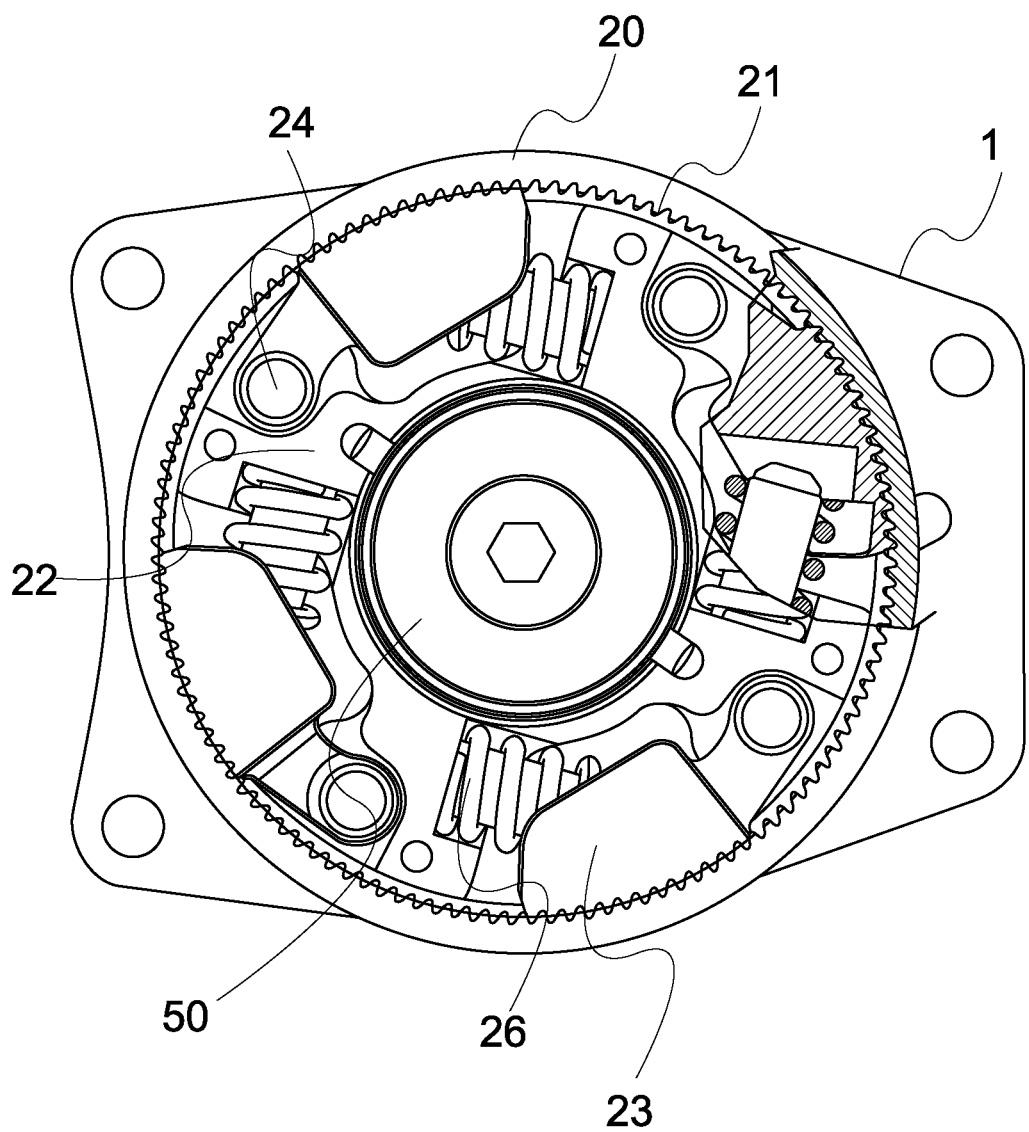
FIG. 4 is a section view of the mechanism of FIG. 1.

The gear mechanism of the disclosure includes a second, ratchet gear mechanism housed within the second gear ring 20. This gear mechanism will be described with reference to FIGS. 3, 4 and 5.

Figure 5:
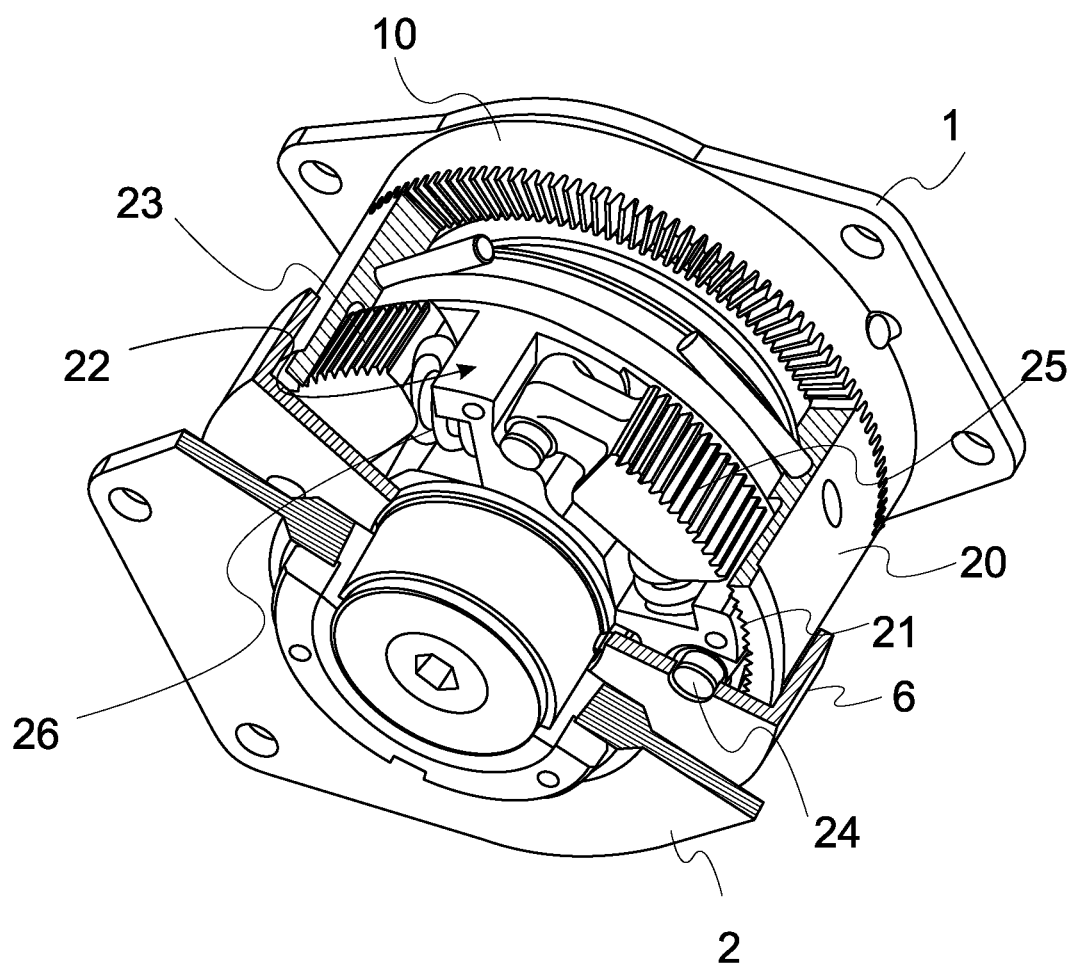
FIG. 5 is an open perspective view of the mechanism of FIGS. 3 and 4.

Referring first to FIG. 5, the outer gear mechanism of the first and second gear rings 10,20 and meshing teeth can be clearly seen. The ratchet gear mechanism is housed within the second gear ring 20 which is provided with the ratchet gear cover 6. The cover 6 is secured to a hub 22 and provides a housing for pins 24 that secure pawls 23. The components of the ratchet gear mechanism can best be seen in FIGS. 3 and 4.

The second gear ring 20 is provided with inwardly extending teeth 21. The hub 22 is provided to be mounted within the ring 20. A series of pawls 23 are mounted around the hub 22 by means of pins 24 about which the pawls can rotate. In the example shown, four pawls 23 are provided equally spaced around interior of the ring 20, but other numbers of pawls may also be utilised. The pawls 23 are provided with outer teeth 25 arranged to mesh with the inwardly extending teeth 21 of the gear ring 20.

The pawls are in engagement with respective linear springs 26 mounted to spring guides 27. Screws 28 may be provided to secure the components as a single unit.

Figure 6A:
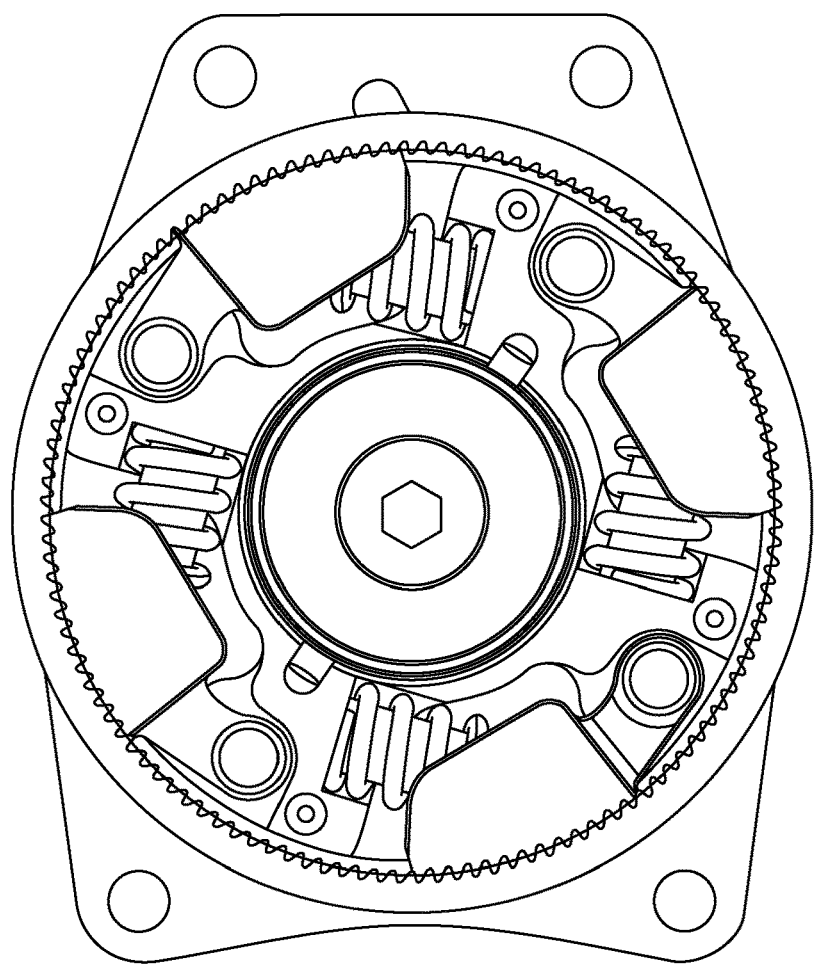
FIG. 6A is a sectional view showing operation of a mechanism according to the disclosure.
Figure 6B:
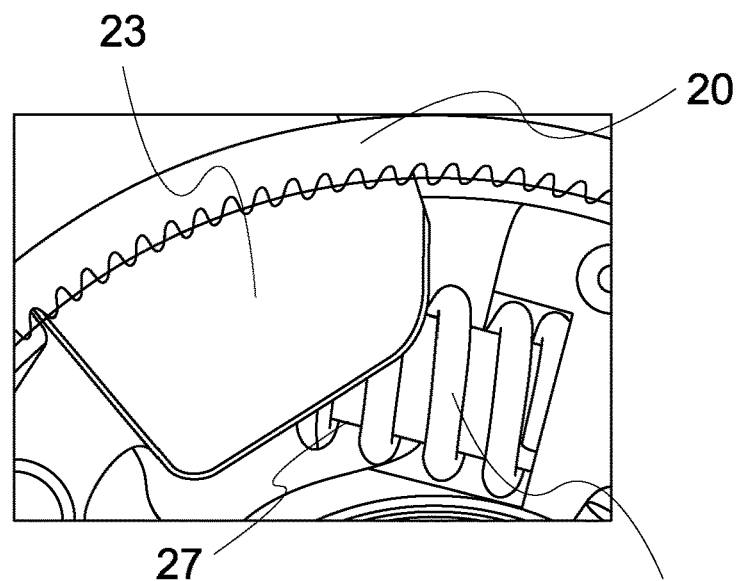
FIG. 6B shows a detail of FIG. 6A.

The ratchet gear mechanism provides an override mechanism to allow the seat back to be easily returned to the upright position by a relatively small force applied to the back of the seat without the need to actuate the cable 5 to disengage the teeth of the crown gear mechanism as described above. In this way, if, for example, the passenger has not returned their seat to the upright position before leaving the aircraft, the seat can be quickly returned to upright by e.g. cabin crew merely applying a pushing force to the seat back. The override mechanism is enabled by the structure of the teeth of the ratchet gear mechanism, and, in particular, the slope of the teeth. The teeth are designed such that one side of each tooth slopes at a relatively gentle angle e.g. 40 degrees, and the other side of the tooth is at a steeper angle e.g. 15 degrees. As seen in FIGS. 6A and 6B, in the anti-clockwise direction, the pawl teeth 25 and the inwardly extending teeth of the gear ring 20 are locked due to the relatively steep angle of the teeth in that direction. This locks the seat back in the set position and avoids an inadvertent return to the upright position in a normal loading situation. In the clockwise direction, the teeth pressure angle is greater e.g. 40 deg. The tooth engagement in this direction can be overcome by the application of a pushing force even though the teeth 3, 3' of the crown gear mechanism are still engaged because the actuator 5 has not been actuated. The amount of force required to return the seat to the upright position using the override mechanism is determined by the force of the linear springs 26—the stiffer the spring, the greater the required force.

Figure 7:
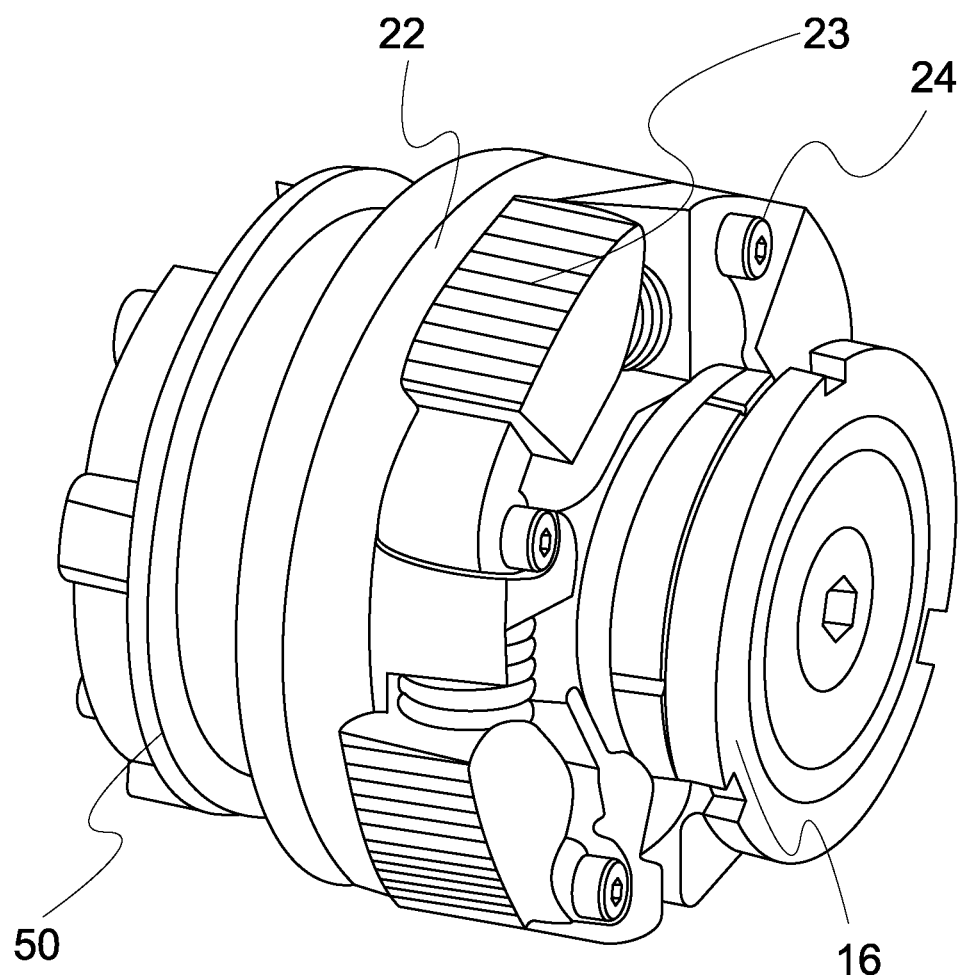
FIG. 7 is a perspective view of internal components of a mechanism according to the disclosure.
Figure 8:
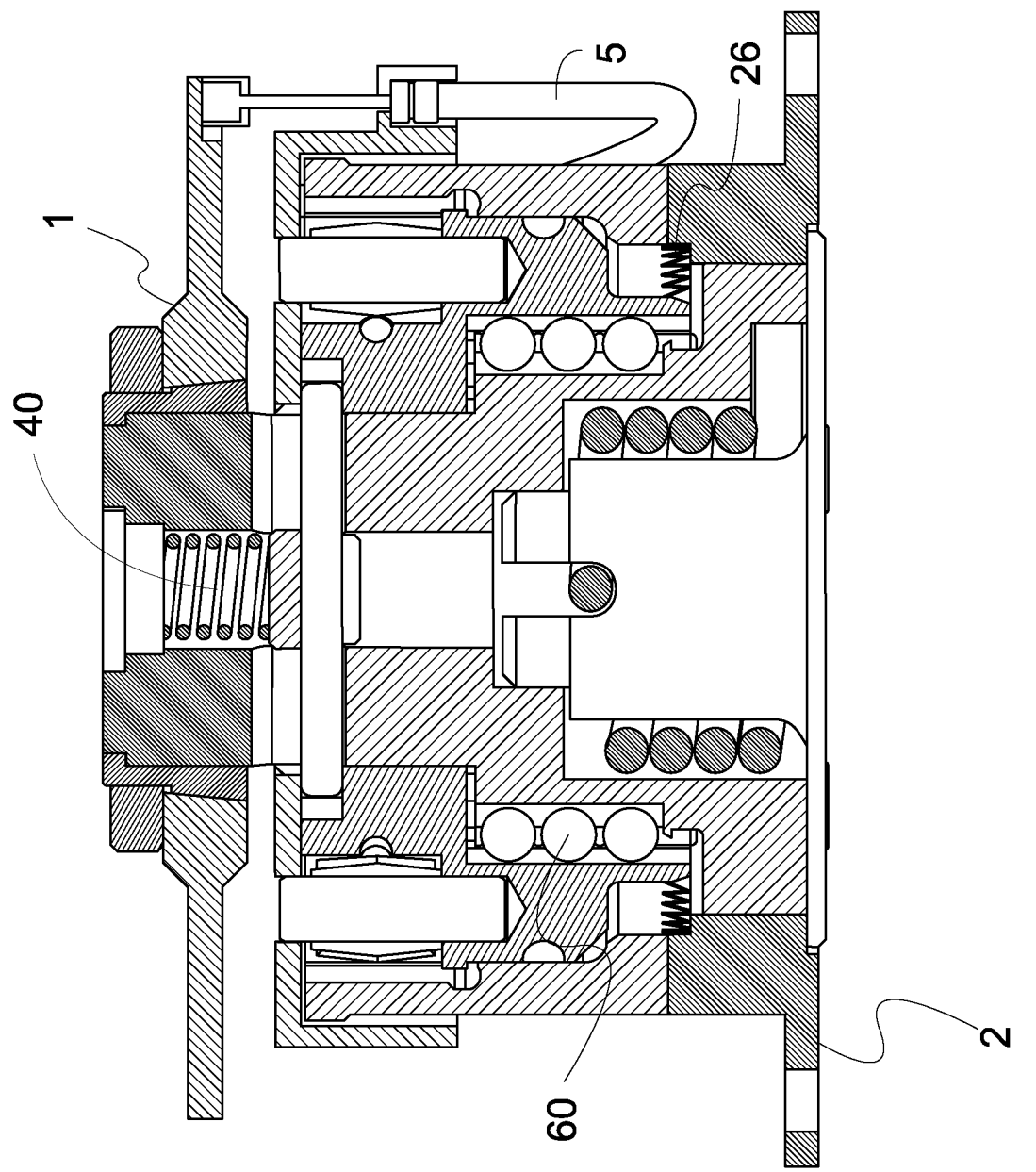
FIG. 8 is a sectional view of the mechanism of FIG. 7.

Another advantageous feature of the present disclosure is the use of a linear guide bearing 60. The hub 22 can slide on this bearing 60 as best seen in FIGS. 7 and 8. The main shaft 50 is provided with races that allow the linear guide bearing 60 to slide on to it. The main shaft 50 can be permanently secured to the flange 2 by means of a shrink disk 30 on the main shaft 50.

One end of the torsional spring 40 is secured to the first flange 1. The other end of the torsional spring is fixed to a locking plate 70. During assembly, the torsional spring 40 is pre-torqued. This mechanism allows the seat back to return to the upright position in normal passenger use by means of the actuator 5 to disengage the crown gear teeth 3, 3' as described above.

In some applications, e.g. in aircraft, there is a desire or need for the seat back to return to an upright position from a recline position automatically in the case of an emergency. This may be necessary, for example, to prevent a passenger in a seat behind a reclined seat, hitting their head on the reclined seat in the cases of a sudden stop or impact. In one example of the mechanism of this disclosure, a so-called HIC (Head Injury Criterion) feature is incorporated into the recline mechanism to automatically return the seat back to the upright position in certain circumstances.

Figure 9:
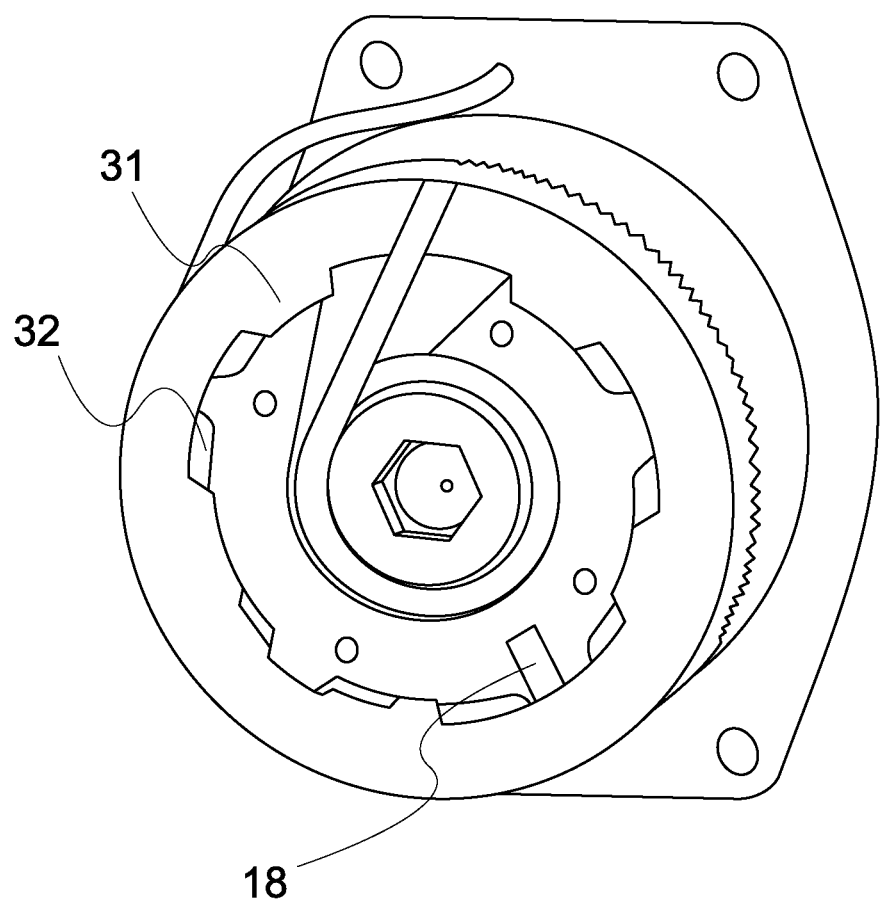
FIG. 9 is an end view of a mechanism according to the disclosure.
Figure 10A:
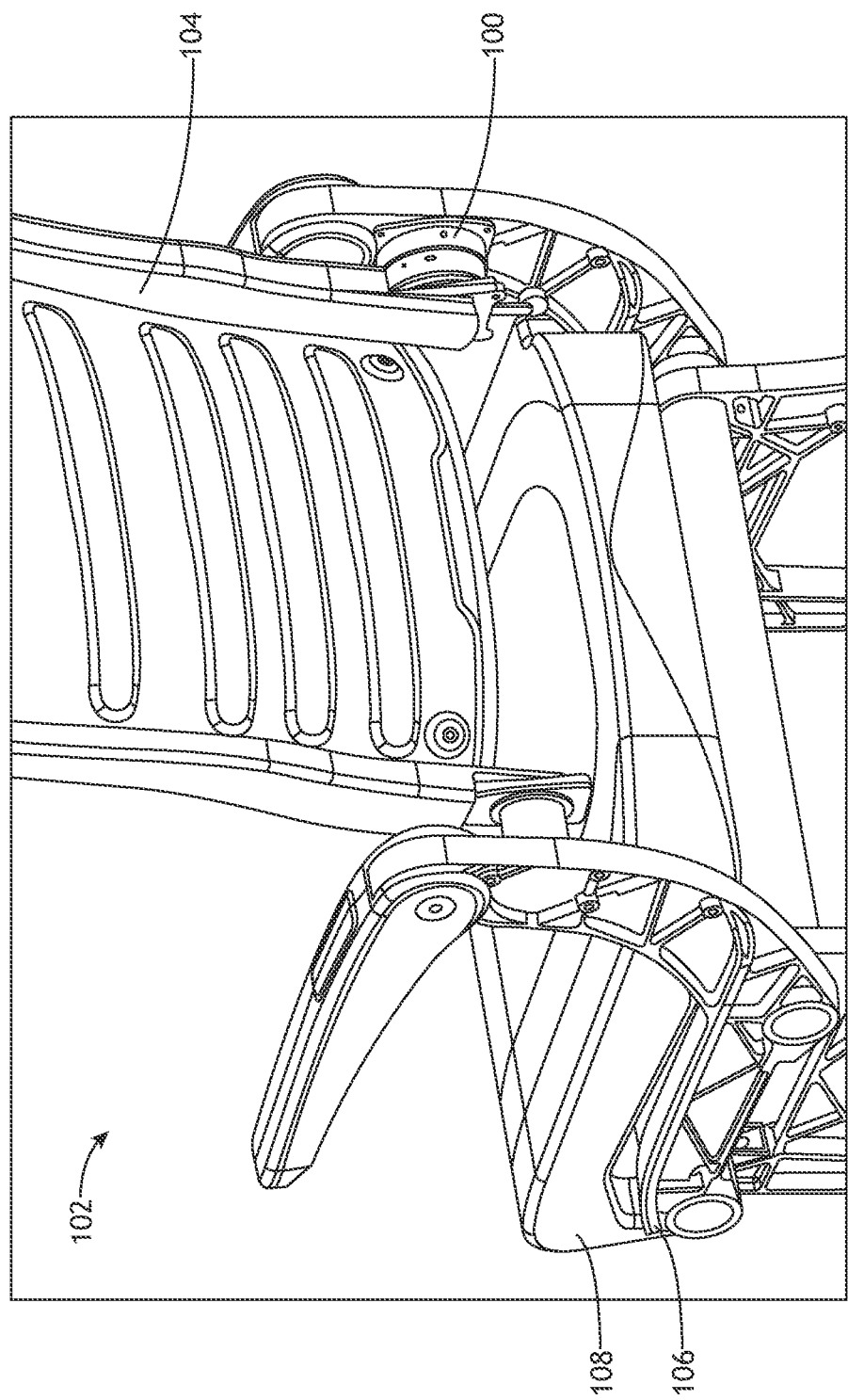
FIG. 10A is a perspective view of an aircraft seat including the rotary recline mechanism according to the disclosure.
Figure 10B:
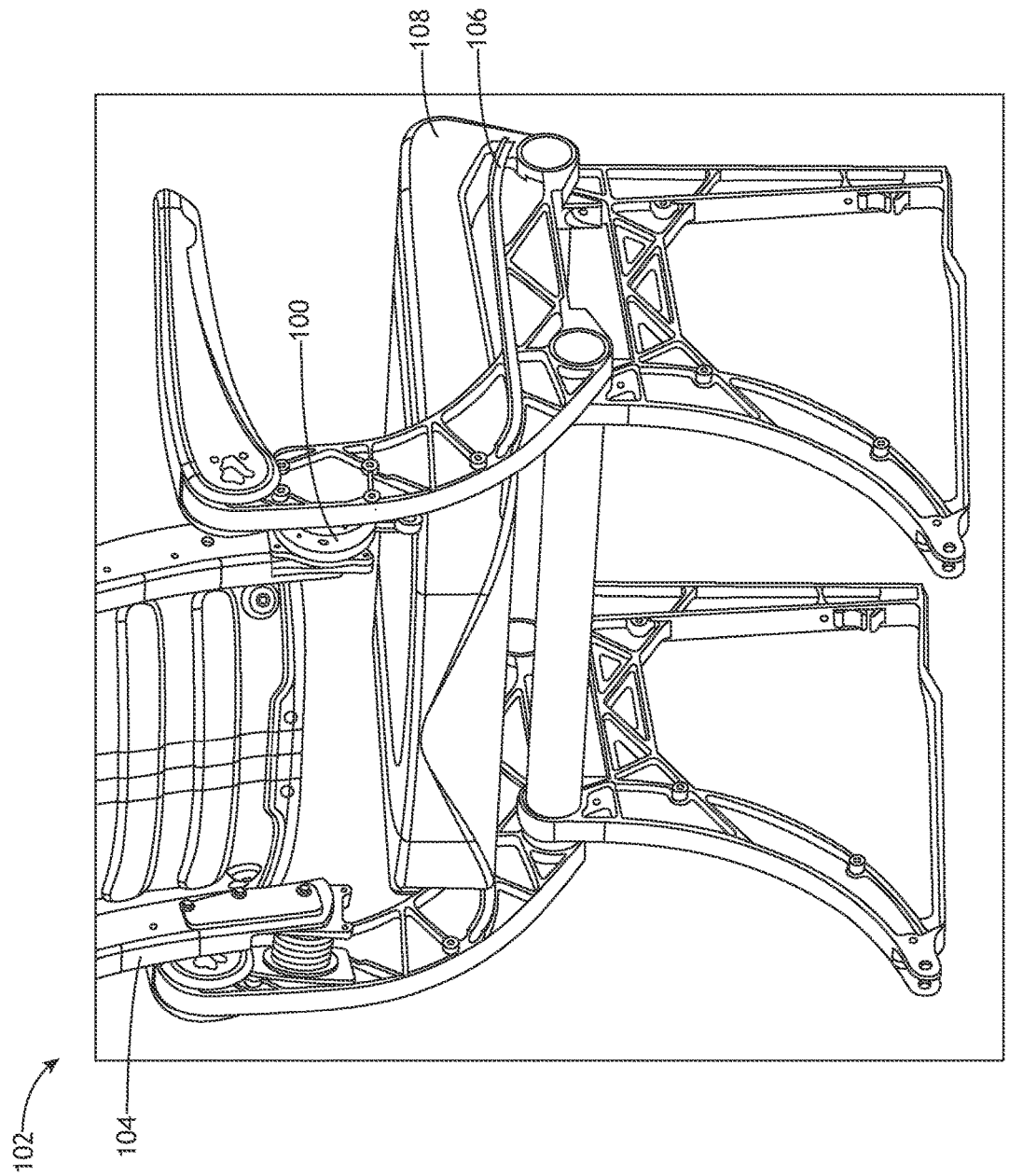
FIG. 10B is a perspective view of an aircraft seat including the rotary recline mechanism according to the disclosure.
Figure 11B:
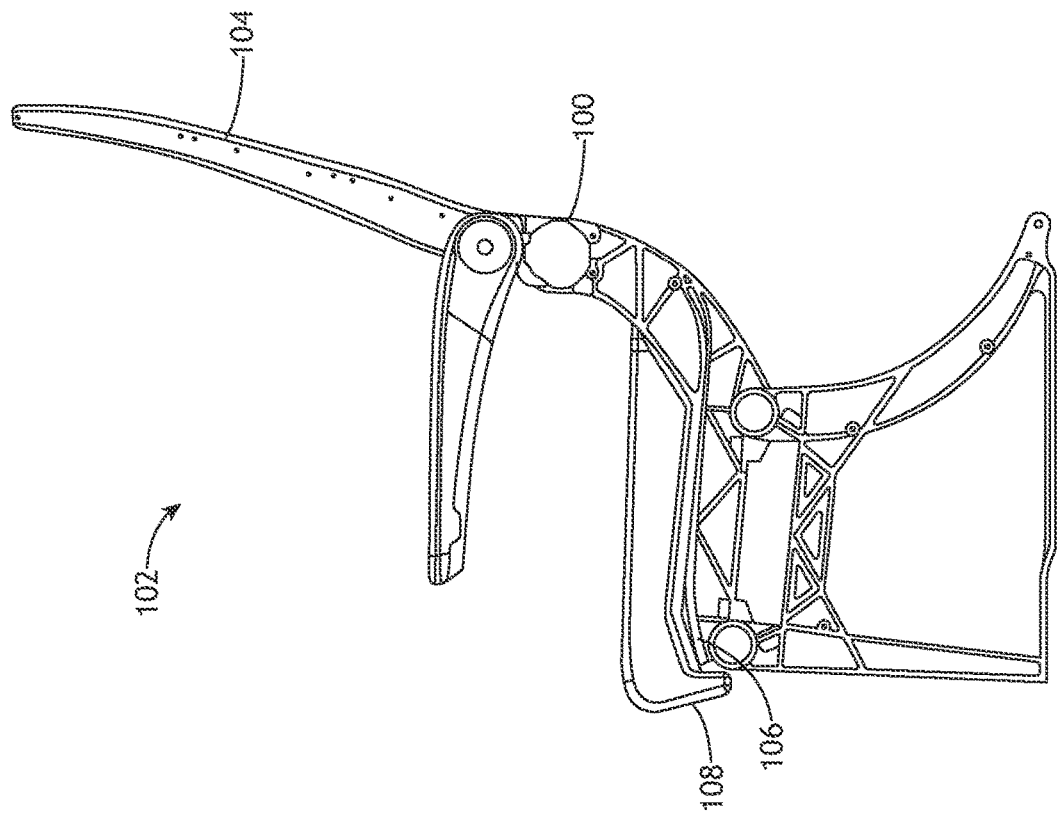
FIG. 11B is a side view of an aircraft seat including the rotary recline mechanism according to the disclosure.
Figure 11A:
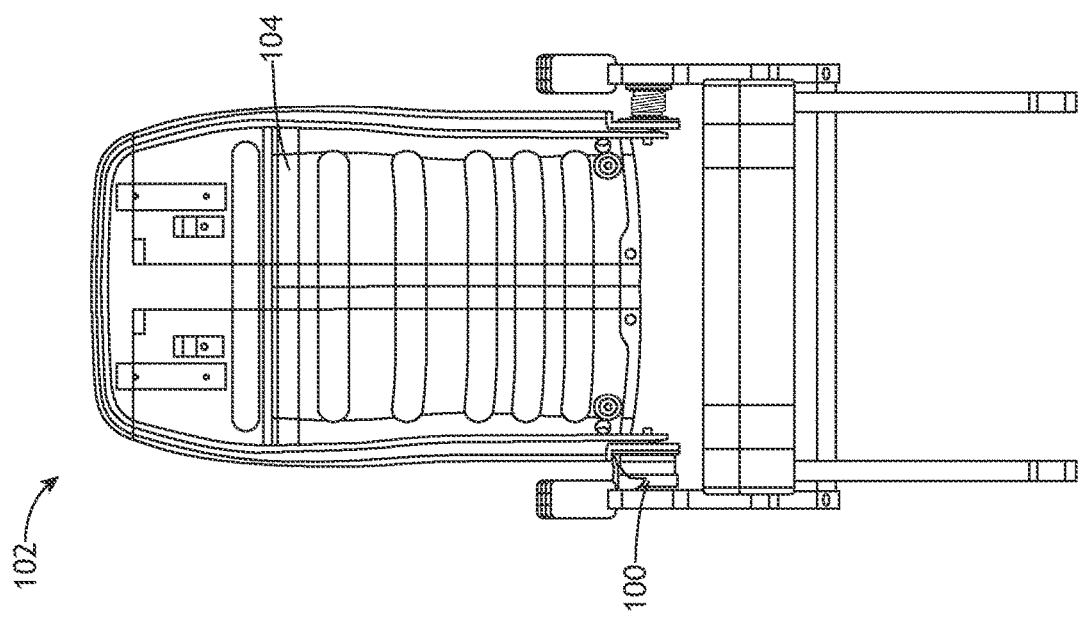
FIG. 11A is a rear-facing view of an aircraft seat including the rotary recline mechanism according to the disclosure.
Figure 11C:
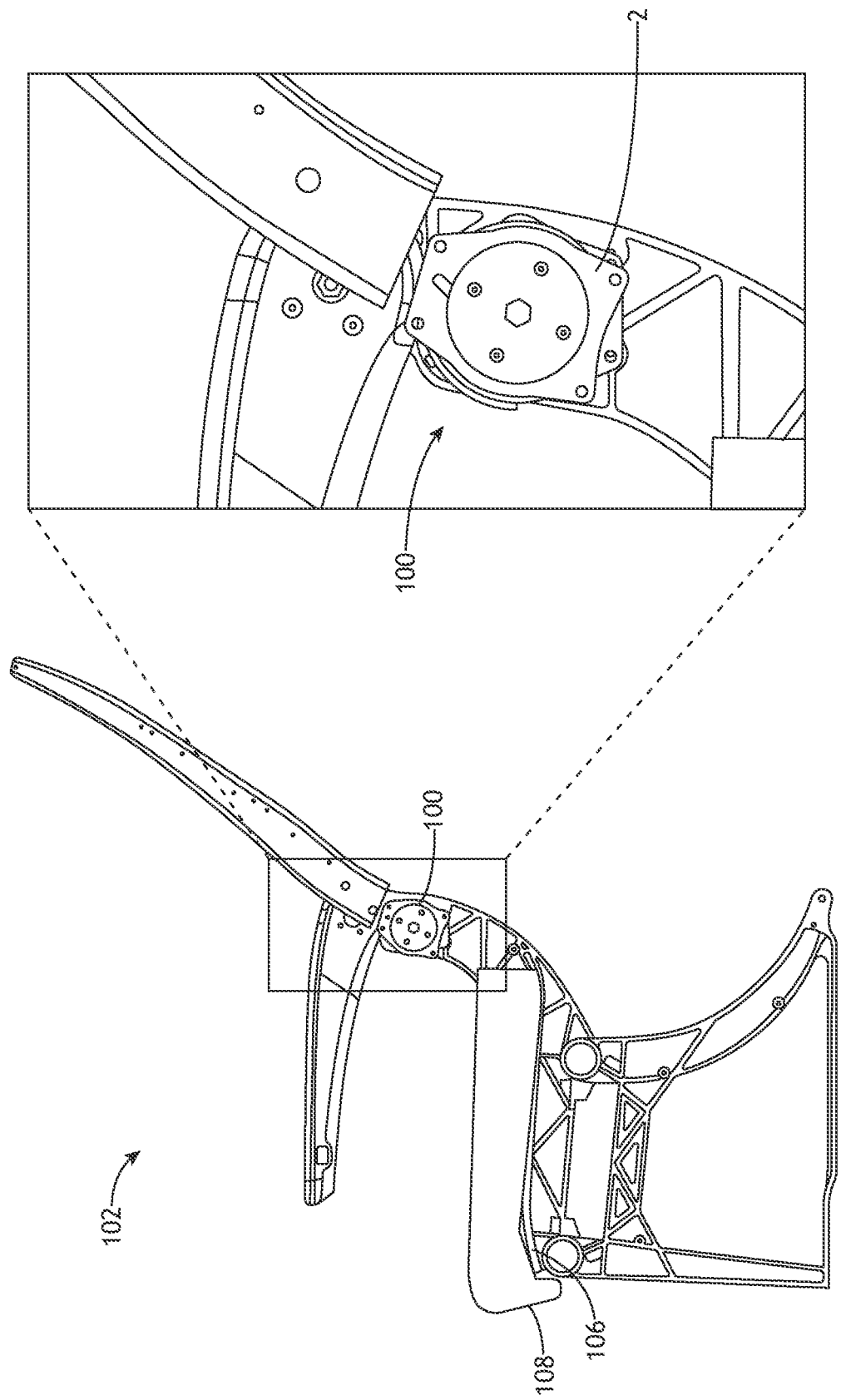
FIG. 11C is a detailed view of an aircraft seat including the rotary recline mechanism according to the disclosure.

The HIC feature will be described in more detail with particular reference to FIG. 9. The HIC feature is provided by a shear pin 18. In normal operation angular rotation between the main shaft 50 and the flange is limited to say 15 degrees to prevent the seat back folding beyond the upright position. This is usually limited by means of hard stops 31,32 on the flange and the main shaft. According to the present disclosure, an additional angular range of movement of say an further 15 degrees can be provided in the event of a HIC event by incorporating a shear pin between the hard stops and having the hard stops spaced for a greater angular range of movement. In normal conditions, the shear pin defines the limit of angular movement of the shaft relative to the flange. In the event of a HIC event, the shear pin is configured to shear such that the range of angular movement is now defined by the hard stops 31,32 and so is greater than when defined by the shear pin.

The recline mechanism of this disclosure is purely mechanical and so avoids the above-mentioned problems associated with gas springs. The mechanism is compact and simple to operate and can also, if required, be easily provided with a HIC mechanism to automatically return the reclining part to an upright position if needed e.g. in the case of emergency. The ability of the override mechanism to allow the seat back to be returned to the upright position without having to actuate the seat button or lever means that cabin crew can quickly prepare the cabin before a flight.

The invention claimed is:

1. A rotary recline mechanism for allowing reclining movement of a first part relative to a second part, the mechanism comprising: a first gear mechanism comprising a first gear ring and a second gear ring having a first set of teeth and a second set of teeth, respectively, that engage to lock the first part and the second part relative to each other and disengage on operation of an actuator to allow relative movement of the first part and the second part by application of a force on one of the parts in a first direction, and a second override gear mechanism to allow relative movement of the first part and the second part by application of a force in a second direction while the first set of teeth and second set of teeth are engaged, wherein the second override gear mechanism is a ratchet gear mechanism comprising:

a second ratchet gear mechanism located within the second gear ring to provide an override function for the rotary recline mechanism whereby the first part relative to the second part can be returned to a start position without disengaging the first set of teeth and the second set of teeth by means of the actuator.

2. The rotary recline mechanism of claim 1, further comprising a first flange configured to attach the mechanism to the first part, and a second flange configured to attach the mechanism to the second part, the first gear ring attached to the first flange and the second gear ring attached to the second flange.

3. The rotary recline mechanism of claim 2, further comprising a main shaft around which the first gear ring and the second gear ring are mounted, wherein the main shaft is permanently secured to the second flange.

4. The rotary recline mechanism of claim 1, further comprising a torsional spring tensioned to bias the first gear ring to a position in which the first part is upright relative to the second part.

5. The rotary recline mechanism of claim 1, wherein the actuator comprises a cable to be pulled by a user.

6. The rotary recline mechanism of claim 1, further comprising a main shaft around which the first gear ring and the second gear ring are mounted.

7. The rotary recline mechanism of claim 6, further comprising a linear guide bearing arranged to slide along the main shaft.

8. The rotary recline mechanism of claim 1, further comprising a ratchet gear cover housing secured to a hub, and a plurality of pawls pivotally mounted to the hub, wherein the second gear ring is provided with a plurality of inwardly extending teeth and the plurality of pawls are provided with outer teeth arranged to mesh with the plurality of inwardly extending teeth.

9. The rotary recline mechanism of claim 8, wherein the pawls are mounted to the hub by means of pins.

10. The rotary recline mechanism of claim 1, wherein at least one of the first set of teeth or the second set of teeth have a slope on one side that is steeper than the slope on a other side to enable the override function.

11. The rotary recline mechanism of claim 1, further comprising a shear pin to limit an angular range of movement between the first part and the second part in normal operation, wherein the shear pin is configured to shear in response to a predetermined force, such that the angular range of movement between the first part and the second part is increased.

12. The rotary recline mechanism of claim 11, further comprising hard stops that limit the angular range of movement to an increased range when the shear pin has sheared.

13. The rotary recline mechanism of claim 1, wherein the first part is a seat back, and the second part is one of a seat pan or a seat cushion of a reclining seat.

14. An aircraft seat comprising:
a seat back adjustable relative to a second part, the second part being one of a seat pan or a seat cushion; and
a rotary mechanism configured to allow reclining movement of the seat back relative to the second part, the rotatory mechanism comprising:
a first gear mechanism comprising a first gear ring and a second gear ring having a first set of teeth and a second set of teeth, respectively, that engage to lock the seat back and the second part relative to each other and disengage on operation of an actuator to allow relative movement of the seat back and the second part by application of a force on one of the seat back or the second part in a first direction; and
a second override gear mechanism to allow relative movement of the seat back and the second part by application of a force in a second direction while the first set of teeth and the second set of teeth are engaged, wherein the second override gear mechanism is a ratchet gear mechanism comprising:
a second ratchet gear mechanism located within the second gear ring to provide an override function for the rotary recline mechanism whereby the seat back relative to the second part can be returned to a start position without disengaging the first set of teeth and the second set of teeth by means of the actuator,
wherein the actuator is provided on or in a seat arm of the aircraft seat.

\* \* \* \* \*